United States Patent
Taylor et al.

(10) Patent No.: US 10,259,434 B2
(45) Date of Patent: Apr. 16, 2019

(54) BRAKING SYSTEM AND METHOD FOR MACHINE

(71) Applicant: Caterpillar SARL, Geneva (CH)

(72) Inventors: Neil Taylor, Cramlington (GB); Roger Tansley, Darlington (GB); John Chapman, Peterlee (GB); Josh Nolke, Franklin, WI (US); Tony Maughan, Seaham (GB); Adam Adeeb, Seaham (GB); John J. Kaufman, Yorkville, IL (US)

(73) Assignee: Caterpillar SARL, Geneva (CH)

( * ) Notice: Subject to any disclaimer, the term of this patent is extended or adjusted under 35 U.S.C. 154(b) by 0 days.

(21) Appl. No.: 15/307,538

(22) PCT Filed: Apr. 24, 2015

(86) PCT No.: PCT/EP2015/058957
§ 371 (c)(1),
(2) Date: Oct. 28, 2016

(87) PCT Pub. No.: WO2015/165824
PCT Pub. Date: Nov. 5, 2015

(65) Prior Publication Data
US 2017/0050626 A1    Feb. 23, 2017

(30) Foreign Application Priority Data
Apr. 28, 2014  (GB) .................................. 1407385.2

(51) Int. Cl.
*B60T 7/12*    (2006.01)
*B60T 13/68*   (2006.01)

(52) U.S. Cl.
CPC ............ *B60T 7/122* (2013.01); *B60T 13/686* (2013.01); *B60T 2201/06* (2013.01)

(58) Field of Classification Search
CPC ..... B60T 2201/06; B60T 7/122; B60T 13/686
See application file for complete search history.

(56) References Cited

U.S. PATENT DOCUMENTS 5,452,946 A * 9/1995 Warner .................... B60T 7/122
                                                    303/24.1
5,531,512 A * 7/1996 Thompson ............ B60T 13/686
                                                    188/151 A
(Continued)

FOREIGN PATENT DOCUMENTS

| EP | 2082933 A1 | 7/2009 |
| GB | 1221883 A | 2/1971 |
| JP | 11-310119 A | 11/1999 |

OTHER PUBLICATIONS

European Patent Office, International Search Report in International Patent Application No. PCT/EP2015/058957, dated Nov. 16, 2015, 2 pp.
(Continued)

*Primary Examiner* — Thomas J Williams
*Assistant Examiner* — James K Hsiao
(74) *Attorney, Agent, or Firm* — Leydig, Voit & Mayer, Ltd.

(57) ABSTRACT

Braking system includes a brake, first valve that actuates the brake based on user input, second valve configured to selectively actuate the brake, and valve actuation system including a user input device moveable between first and second positions. A brake sensor provides a signal indicative of actuation of the first valve. The valve actuation system activates the second valve if the user input device is in the first position and the first valve engaged, retaining the second valve in active state if the first valve is disengaged, deactivating the second valve if the user input device is in the second position.

18 Claims, 3 Drawing Sheets

(56) References Cited

U.S. PATENT DOCUMENTS

| | | | |
|---|---|---|---|
| 5,984,429 A | 11/1999 | Nell et al. | |
| 6,322,161 B1* | 11/2001 | Maslonka | B60T 7/12 |
| | | | 303/119.1 |
| 6,439,675 B1 | 8/2002 | Zechmann et al. | |
| 6,450,587 B1* | 9/2002 | MacGregor | B60T 7/10 |
| | | | 303/89 |
| 8,909,449 B2* | 12/2014 | Eberling | B60T 8/1708 |
| | | | 303/121 |
| 2002/0065170 A1* | 5/2002 | Suzuki | F16H 61/20 |
| | | | 477/171 |
| 2004/0124697 A1* | 7/2004 | MacGregor | B60T 17/08 |
| | | | 303/89 |
| 2007/0012008 A1* | 1/2007 | Fackler | A01D 41/14 |
| | | | 56/3 |
| 2009/0198427 A1* | 8/2009 | Christopher Jackson | |
| | | | B60T 7/122 |
| | | | 701/70 |

OTHER PUBLICATIONS

United Kingdom Intellectual Property Office, Search Report in United Kingdom Patent Application No. GB1407385.2, dated Nov. 17, 2014, 1 p.

* cited by examiner

BRAKING SYSTEM AND METHOD FOR MACHINE

CROSS-REFERENCE TO RELATED APPLICATION

This application is a national phase application of International Patent Application No. PCT/EP2015/058957, filed Apr. 24, 2015, which claims priority to Great Britain patent Application No. GB 1407385.2, filed Apr. 28, 2014, both of which are incorporated by reference herein in their entireties for all purposes.

TECHNICAL FIELD

The present disclosure relates to a braking system and method for a machine.

BACKGROUND

Generally, braking systems for machines include one or more brakes associated with wheels of the machine. The brakes are used to stop or halt the machine during operation by actuating a brake pedal. During traffic-related pauses, and specifically during traffic-related pauses on slopes, it is very inconvenient for an operator of the machine to continuously press the brake pedal to keep the machine stationary. Also, during hoisting and/or dumping operations, the operator may need to continuously press the brake pedal in order to halt the machine at a specific location. This may be inconvenient for the operator. Further, if the operator unintentionally removes his foot from the brake pedal, the machine may move from its position.

U.S. Pat. No. 5,984,429 discloses that in traffic-related stationary phases, a drive ratio of the transmission remains engaged with the engine running on a road vehicle equipped with automatic transmission. The service brake automatically remains activated for a short time after the vehicle has come to a halt as a result of a targeted braking operation. Thereby, the driver is allowed to remove his/her foot from the brake pedal, and the vehicle can be held stationary in a reliable manner on a flat or sloping road surface. This holding braking mode of the vehicle service brake system is cancelled when the driver actuates the accelerator pedal whose position is monitored by a switch.

SUMMARY

In one aspect of the present disclosure, a braking system for a machine is provided. The braking system includes a brake, a first valve, a second valve and a valve actuation system. The brake is associated with wheels of the machine and is configured to be hydraulically actuated by a pressurized fluid. The first valve actuates the brake based on a user input. The second valve is configured to selectively actuate the brake. The valve actuation system includes a user input device moveable between a first and a second position. The valve actuation system further includes a brake sensor configured to provide a signal indicative of actuation of the first valve. The valve actuation system activates the second valve if the user input device is in the first position and the first valve is engaged. The valve actuation system retains the second valve in the active state to hydraulically actuate the brake even if the first valve is disengaged. Furthermore, the valve actuation system deactivates the second valve if the user input device is moved to the second position.

In another aspect of the present disclosure, a method of braking a machine is provided. The method receives a position of a user input device. The method determines if a first valve is engaged by a user, wherein the first valve is configured to hydraulically actuate a brake. The method activates a second valve based on a first position of the user input of device and the engagement of the first valve. The method further retains the second valve in the active state to hydraulically actuate the brake even if the first valve is disengaged. Furthermore, the method deactivates the second valve based on a second position of the user input device.

Other features and aspects of this disclosure will be apparent from the following description and the accompanying drawings.

DETAILED DESCRIPTION

Figure 1:
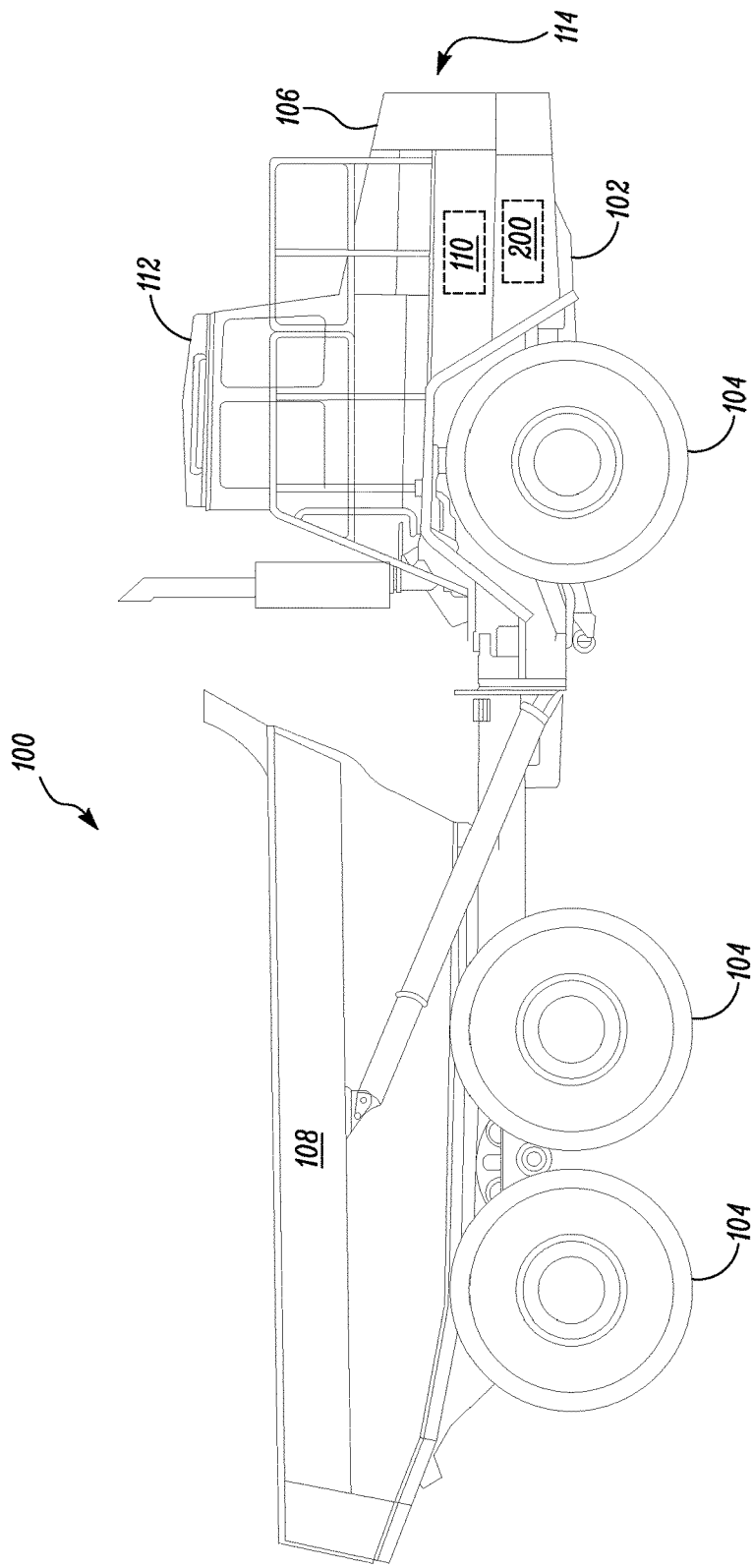
FIG. 1 illustrates an exemplary machine, according to an embodiment of the present disclosure.

The present disclosure relates to a braking system and method for a machine. FIG. 1 illustrates an exemplary machine 100, according to an embodiment of the present disclosure. As illustrated in FIG. 1, the machine 100 may be embodied as an articulated truck. In various other embodiments, the machine 100 may be any machine such as, a track loader, a wheel loader, a compactor, an excavator, a large mining truck, or any other agricultural, mining, construction machinery etc.

As illustrated in FIG. 1, the machine 100 includes a frame 102, wheels 104, an engine compartment 106, and a payload carrier 108. The machine 100 may further include an engine 110 positioned in the engine compartment 106 and supported on the frame 102. The engine 110 may be an internal combustion engine, for example, a petrol engine, a diesel engine, a gas powered engine, or a dual fuel engine. In the illustrated embodiment, a cab 112 is mounted on a front end 114 of the frame 102 of the machine 100. The cab 112 may be disposed above the engine 110 and extend rearward beyond the engine 110.

Furthermore, the machine 100 includes a braking system 200 associated with the wheels 104 of the machine 100. The braking system 200 is used to slow and/or halt the machine 100 as and when required. The braking system 200 may include a brake pedal 116 (shown in FIG. 2) and a parking brake (not shown) disposed within the cab 112. The braking system 200 is further explained in greater detail with reference to FIG. 2.

Figure 2:
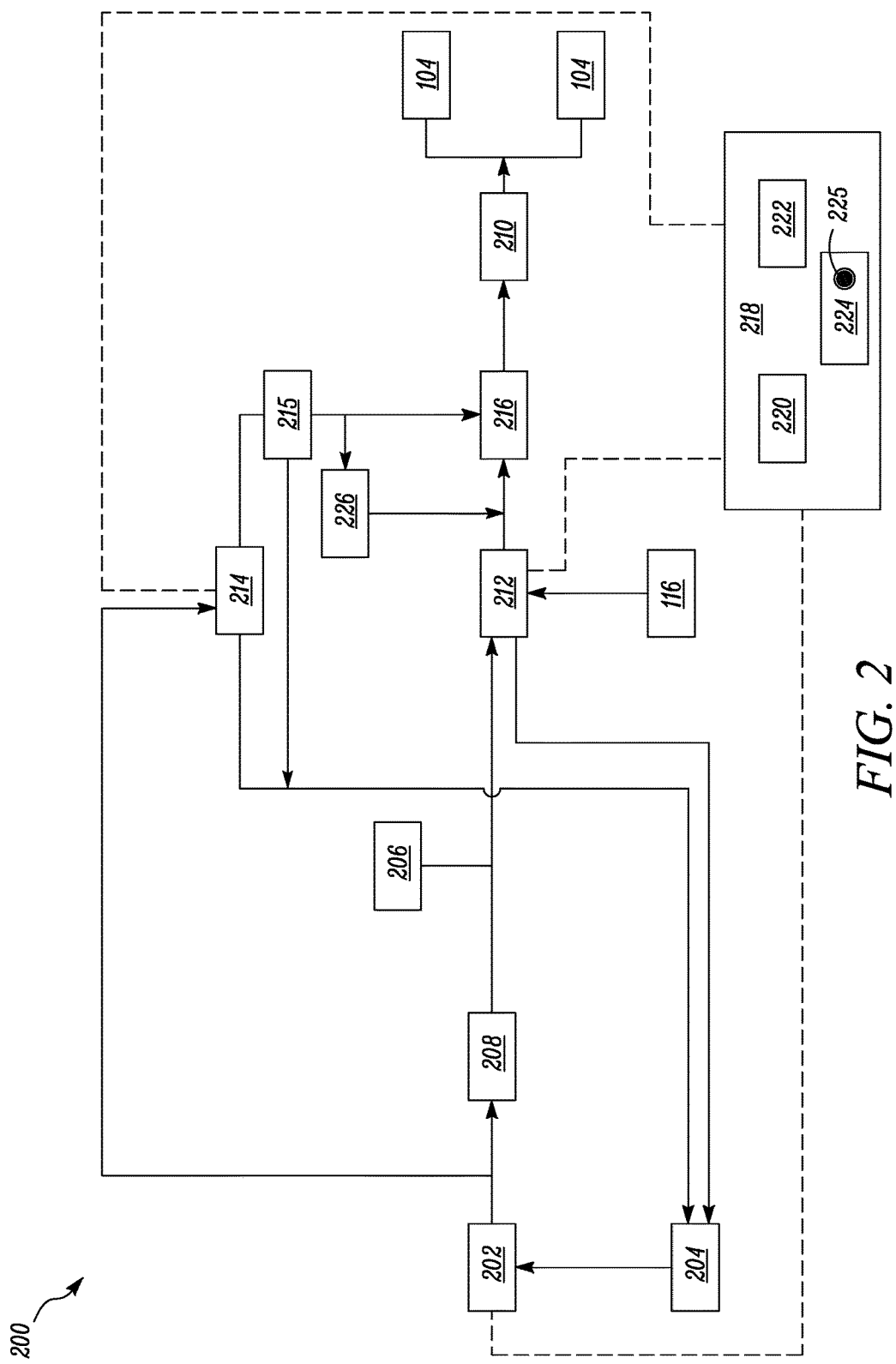
FIG. 2 illustrates a block diagram of a braking system of the machine, according to an embodiment of the present disclosure.

FIG. 2 illustrates a block diagram of the braking system 200 of the machine 100 of FIG. 1. For the sake of simplicity, one or more other components of the braking system 200 are not shown in FIG. 2. It may be contemplated that the block diagram is merely exemplary, which includes both hydraulic connections (shown in solid lines) and electric connections (shown in dotted lines), and is not to be construed in a limiting manner.

The braking system 200 includes a brake pump 202 fluidically connected to a fluid tank 204 and configured to provide a hydraulic fluid to one or more accumulators 206 via a pressure control valve 208. The brake pump 202 may be driven by power derived from the engine 110 (shown in FIG. 1). It may be contemplated that the brake pump 202 is configured to output the hydraulic fluid at a high pressure. The pressure control valve 208 is configured to reduce the pressure of the fluid from the brake pump 202 to a desired pressure, which is further supplied to the accumulators 206 for storage. In an exemplary embodiment, the pressure control valve 208 includes a pressure relief valve and a check valve. The pressure relief valve is configured to reduce the pressure of the hydraulic fluid by bleeding some high pressure fluid back into the fluid tank 204. Further, the check valve may prevent back flow of the hydraulic fluid to the brake pump 202.

The braking system 200 includes a brake 210 associated with the wheels 104 of the machine 100 and a first valve 212 configured to actuate the brake 210. In an exemplary embodiment, the first valve 212 may be a treadle valve associated and actuated by the brake pedal 116 within the cab 112 of the machine 100. The operator of the machine 100 may press the brake pedal 116, to actuate the first valve 212, and hence the brake 210. The actuation of the first valve 212 may allow the fluid flow from the accumulators 206 to the brake 210 via the first valve 212. In an exemplary embodiment, the brake 210 may include a brake disc (not shown) associated with each of the wheels 104 of the machine 100. In various other embodiments, the brake 210 may include a drum brake or any other type of brake known in the art. The brake 210 may further include one or more brake cylinders configured to selectively press one or more brake pads (not shown) against the corresponding brake discs in order to achieve braking. The cylinders may be hydraulically actuated by the pressurized fluid from the first valve 212. It may be contemplated that one brake cylinder may be associated with front wheels of the machine 100, while another brake cylinder may be associated with rear wheels of the machine 100.

The braking system 200 further includes a second valve 214 in fluid communication with the brake pump 202, and the brake 210 via a selection valve 216. A pressure regulator 215 is also provided between the second valve 214 and the selection valve 216. The pressure regulator 215 may be configured to bleed excess fluid to the fluid tank 204. In an exemplary embodiment, the second valve 214 is a solenoid operated valve configured to be activated in response to an electric signal to further actuate the brake 210. In a further embodiment, the second valve 214 may be a 2-way, 3-port solenoid actuated valve with a first port connected to the brake pump 202, a second port connected to the fluid tank 204, and a third port connected to the brake 210 via the selection valve 216. The third port may be normally in fluid communication with the second port (i.e. the fluid tank 204) when the second valve 214 is not activated. When activated, the first port may be in fluid communication with the second port, i.e., the second valve 214 allows a flow of a pressurized fluid from the brake pump 202 to the pressure regulator 215. Further, in an exemplary embodiment, the selection valve 216 may be a shuttle valve configured to facilitate fluid flow from the first valve 212 and/or the second valve 214 to the brake 210 based on the fluid pressure from them. Therefore, in case both the first and second valves 212, 214 are activated, the pressurized flow having the higher pressure flows to the brake 210. In various alternative embodiments, the second valve 214 may be actuated non-electrically. For example, the second valve 214 may be actuated pneumatically, hydraulically, or the like.

Further, the braking system 200 includes a valve actuation system 218 communicably coupled to the second valve 214. The valve actuation system 218 is configured to actuate the brake 210 by selectively activating the second valve 214. It may be contemplated by a person having ordinary skill in the art that the valve actuation system 218 may be a controller or an electric circuit configured to control the first valve 212 and the second valve 214. The valve actuation system 218 may include any appropriate type of a general purpose computer, special purpose computer, microprocessor, microcontroller, or other programmable data processing apparatus. In an aspect of the present disclosure, the valve actuation system 218 may be part of a machine control module (ECM).

In an embodiment, the valve actuation system 218 includes one or more brake sensor(s) 220, an actuation sensor 222 and a user input device 224 electrically coupled to the actuation sensor 222. It may be contemplated that, in case of multiple brakes, there may be one brake sensor 220 associated with each brake 210. The brake sensor 220 is associated with the first valve 212 and is configured to provide a signal indicative of actuation of the first valve 212. In an exemplary embodiment, the brake sensor 220 is a pressure switch configured to provide a signal when a pressure of the fluid flow from the first valve 212 is greater than a predetermined threshold P1. It may be contemplated that the threshold P1 is selected such that it clearly identifies if the operator has pressed the brake pedal 116 to stop the machine 100 and not to decrease the speed of the machine 100.

Further, the user input device 224 is operatively coupled to the second valve 214. In an example, the user input device 224 may be provided on a dashboard within the cab 112. However, the user input device 224 may be provided in any alternative location within the scope of the present disclosure. In an exemplary embodiment, the user input device 224 is a dual momentary rocker switch. The user input device 224 may be switched to a first position, such as an ON position, or a second position, such as an OFF position and/or a third position which is a spring biased central position. It may be contemplated, that the user input device 224 may be connected to an electrical power supply of the machine 100 and may be configured to selectively connect and disconnect the second valve 212 and the third valve 226 to and from the power source.

Furthermore, the actuation sensor 222 is associated with the second valve 214 and is configured to provide a signal indicative of a flow of hydraulic fluid from the second valve 214 in response to an electric signal from the user input device 224. For example, when the operator presses the user input device 224 to the first position, the electric signal from the user input device 224 is provided to the second valve 214 as well as the valve actuation system 218. In an exemplary embodiment of the present disclosure, the actuation sensor 222 is a pressure switch configured to provide a signal when a pressure of the fluid flow from the second valve 214 exceeds a second predetermined threshold P2. In an exemplary embodiment, the second threshold pressure P2 is substantially equal to or greater than the predetermined threshold P1.

The valve actuation system 218 is configured to receive the signals from the brake sensor 220 and the actuation sensor 222, and accordingly control the fluid flow to the brake 210 via the first valve 212 and/or the second valve 214. In an exemplary embodiment, the valve actuation system 218 is configured to activate the second valve 214 if the user input device 224 is in the first position and when the first valve 212 is also actuated.

Furthermore, the valve actuation system 218 also actuates a third valve 226 simultaneously with the actuation of the second valve 214. The third valve 226 is communicably coupled to the valve actuation system 218. The third valve 226 is configured to isolate the flows of the pressurized fluid from the first valve 212 and the second valve 214 when activated. However, in the deactivated state, the third valve 226 allows flow of the pressurized fluid therethrough. In an embodiment, the third valve 226 may allow flow of the pressurized fluid to the fluid tank 204 in the deactivated state. In an exemplary embodiment, the third valve 226 may be a 2-way 2-port solenoid operated poppet valve In an example, the operator presses the brake pedal 116 in order to halt the machine 100. The operator may further switch the user input device 224 to the first position, i.e., the ON position in order to initiate a waiting brake mode of the machine 100. The waiting brake mode may refer to a mode when the brake 210 may remain engaged even when the operator removes his foot from the brake pedal 116. When the user input device 224 is in the first position and the brake pedal 116 is also engaged, the current flows through the brake sensor 220 associated with the first valve 212. The valve actuation system 218 may then activate the solenoids of the second valve 214 and the third valve 226. The pressurized fluid flows from the first valve 212 and the second valve 214 are therefore isolated. Moreover, the selection valve 216 may allow one of the pressurized flows from the first and second valves 212, 214 to reach the brake 210 depending on their pressures. It may also be contemplated that the selection valve 216 allows the pressurized flows from the first and second valves 212, 214 to simultaneously reach the brake 210. Further, the actuation sensor 222 may also provide a signal indicative of the flow of the pressurized fluid from the second valve 214.

In an exemplary embodiment, the user input device 224 further includes an indicator 225 configured to indicate that the second valve 214 is activated. In an exemplary embodiment, the indicator 225 may be a Light Emitter Diode (LED) light which glows when the second valve 214 is activated. Therefore, as the user input device 224 is moved to the first position, current also flows through the indicator 225, thereby lighting the LED light to indicate that the second valve 214 is activated. In various alternative embodiments, the indicator 225 may be any type of visual, audio and/or textual indicator to indicate that the second valve 214 is activated.

In an embodiment, the valve actuation system 218 is configured to retain the second valve 214 in the actuated state even when the first valve 212 is disengaged. For example, the operator may release the brake pedal 116 and also release the user input device 224, thereby bringing the user input device 224 to the third position which is the spring biased central position. In the third position, the current may continue to pass through the actuation sensor 222. As the operator disengages the brake pedal 116, flow of the pressurized fluid is discontinued to the brake 210 through the first valve 212. Consequently, the brake sensor 220 may return to an open state and not provide any signal. In an embodiment, the brake sensor 220 and the actuation sensor 222 may be electrically coupled in a parallel manner between the user input device 224 and the solenoids of the second and third valves 214, 226. Thus, even if the brake sensor 220 is not providing a signal, the actuation sensor 222 may enable continued activation of the solenoids by the electrical power from the user input device 224. The selection valve 216 may now allow the pressurized fluid from the second valve 214 to reach the brake 210, as pressure from the first valve 212 drops. Consequently, the brake 210 may remain engaged even if the operator releases the brake pedal 116, and the machine 100 may remain stationary.

In various alternative embodiments, the user input device 224, the brake sensor 220, and the actuation sensor 222 may be part of a control logic implemented by the valve actuation system 218. The valve actuation system 218 may therefore actuate the second and third valves 214, 226 based on signals from the user input device 224, the brake sensor 220, and the actuation sensor 222.

Furthermore, the valve actuation system 218 may be configured to deactivate the second valve 214 if the user input device 224 is moved to the second position, i.e., the OFF position. In an embodiment, the user input device 224 may electrically disconnect the solenoid of the second valve 214 from the electrical power supply of the machine 100 in the OFF position. Simultaneously, the third valve 226 may also be deactivated. The indicator 225 may also be deactivated. Due to deactivation of the second valve 214, the actuation sensor 222 may return to an open state and stop providing any signal. After being released by the operator, the user input device 224 may move to the third position. Thus, the waiting brake mode is terminated and normal braking operation may resume. Thereafter, the operator may then actuate the brake 210 by pressing the brake pedal 116.

In an exemplary embodiment, the valve actuation system 218 is further configured to prevent accidental initiation of the waiting brake mode. Specifically, the valve actuation system 218 may not activate the second valve 214 if the user input device 224 is moved to the first position without engaging the brake 210.

INDUSTRIAL APPLICABILITY

The industrial applicability of the braking system 200 and the valve actuation system 218 of the machine 100 described herein will be readily appreciated from the foregoing discussion.

Generally, while waiting in queues on a slope and/or during hoisting and/or dumping operations, operators need to press a brake pedal continuously to hold the machine still. This may be inconvenient to the operator.

The present disclosure relates to the braking system 200 having the user input device 224 which may be activated by the operator to apply the brake 210 without foot pressing the brake pedal 116 for a long time, such as on slopes. The arrangement of the user input device 224 and the valve actuation system 218 may be cost efficient, easy to install and convenient for the operator.

Figure 3:
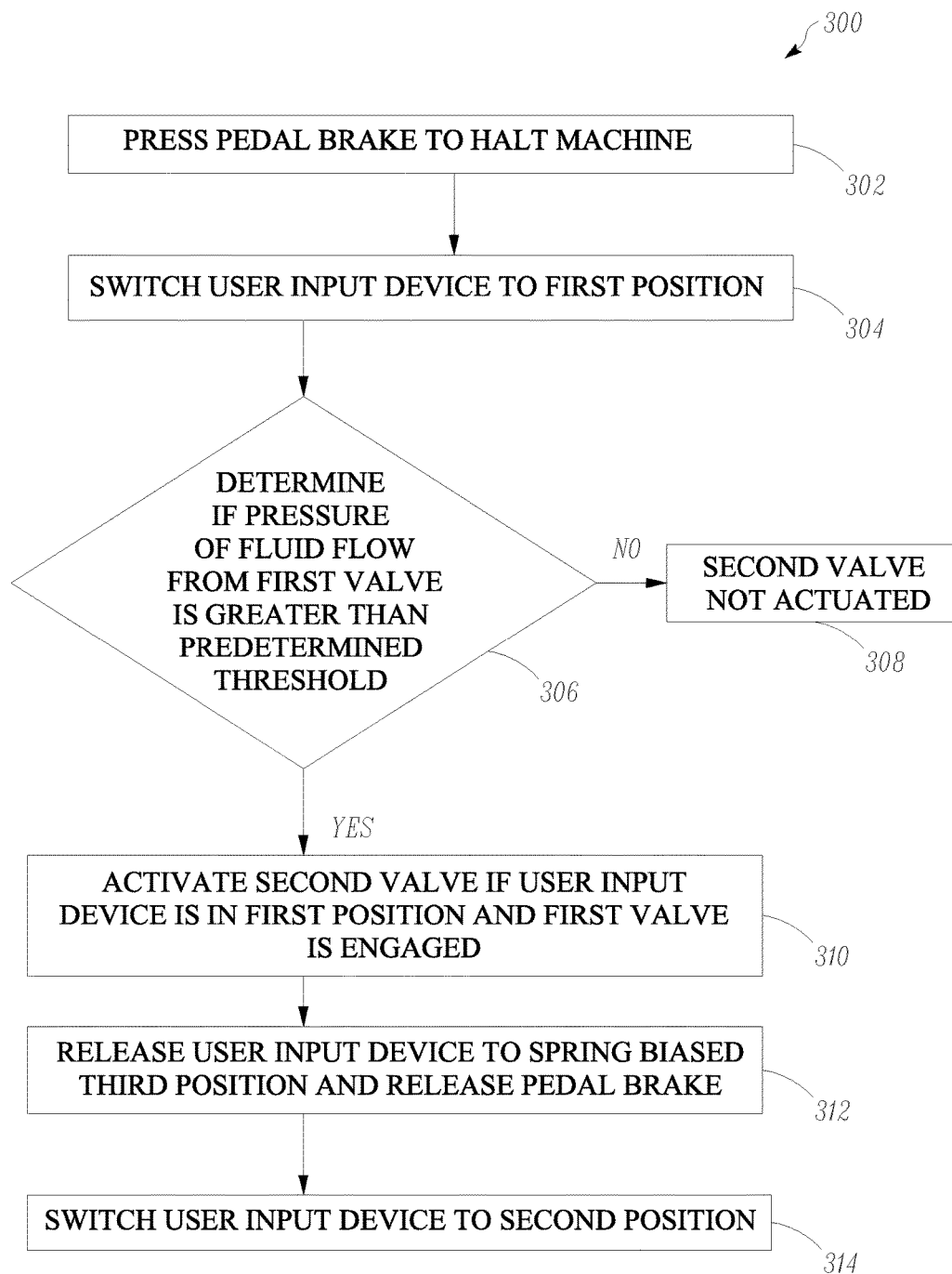
FIG. 3 illustrates a flowchart for an exemplary method of operating the braking system of FIG. 2, according to an embodiment of the present disclosure.

FIG. 3 illustrates a flowchart for a method 300 of braking the machine 100, according to an embodiment of the present disclosure. Initially, at step 302, the operator presses the brake pedal 116 to halt the machine 100.

At step 304, the operator switches the user input device 224 to the first position, i.e., the ON position. In an exemplary embodiment, the valve actuation system 218 of the braking system 200 receives the position of the user input device 224. For example, the valve actuation system 218 receives an electric signal from the user input device 224 based on its position.

At step 306, the valve actuation system 218 determines if a pressure of the fluid flow from the first valve 212 is greater than a predetermined threshold P1. If the pressure is less than the predetermined threshold P1, then the control moves to step 308, and the second valve 214 is not actuated. If the pressure is greater than the predetermined threshold P1, then the control moves to step 310.

Further, at step 310, the valve actuation system 218 activates the second valve 214 if the user input device 224 is in the first position and the first valve 212 is engaged. In an exemplary embodiment, the second valve 214 is a solenoid operated valve configured to be activated in response to an electric signal from the user input device 224 to further actuate the brake 210.

Furthermore, the valve actuation system 218 also actuates the third valve 226 simultaneously with the actuation of the second valve 214. The third valve 226 is configured to isolate the flows of the pressurized fluid from the first valve 212 and the second valve 214. When the first valve 212 is actuated and the second valve 214 is actuated, then the pressurized fluid flows to the brake 210 through the first valve 212 and/or the second valve 214. Thus, the waiting brake mode may be initiated.

At step 312, the operator releases the user input device 224 to the spring biased third position and releases the brake pedal 116. The valve actuation system 218 retains the second valve 214 in the active state to hydraulically actuate the brake 210 even if the first valve 212 is disengaged. Consequently, the brake 210 may remain engaged even if the operator releases the brake pedal 116, and the machine 100 may remain stationary. Further, when the operator releases the brake pedal 116, the pressure through the first valve 212 decreases, thereby resulting in the biasing of the selection valve 216 towards the pressurized flow from the second valve 214

At step 314, the operator switches the user input device 224 to the second position. The valve actuation system 218 deactivates the second valve 214 and the third valve 226 based on the second position of the user input device 224. For example, the operator may switch the user input device 224 to electrically disconnect the second valve 214 from the electrical power supply of the machine 100. Thus, the waiting brake mode may be terminated. The operator may simultaneously press the brake pedal 116 to smoothly transition from the waiting brake mode to normal operation.

Thus, the braking system 200 and method 300 may enable the operator to release the brake pedal 116 while waiting at a location, and also keep the machine 100 stationary by keeping the brake 210 engaged. This may be more convenient for the operator, and also prevent any unintentional release of the brake pedal 116 while waiting. Further, the user input device 224 may provide an easy interface for the operator to initiate and terminate the waiting brake mode. The indicator 225 may provide a clear indication when the waiting brake mode has commenced so that the operator may safely release the brake pedal 116. Moreover, accidental triggering of the waiting brake mode may also be prevented.

The second valve 214 of the braking system 200 may be connected to the brake pump 202. Further, the second valve 214 is connected to the brake 210 via the pressure regulator 215 and the selection valve 216. Therefore, normal braking using the first valve 212 may be kept separate from braking during the waiting brake mode using the second valve 214. Specifically, the second valve 214 may not interfere with normal operation of the machine 100.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A braking system for a machine, the braking system comprising:
    a brake associated with a wheel of the machine, the brake configured to be hydraulically actuated by a pressurized fluid;
    a first valve configured to actuate the brake based on an input from a user;
    a second valve configured to selectively actuate the brake;
    a brake pump fluidly coupled to the brake via the first valve along a fluid path that does not include the second valve; and
    a valve actuation system communicably coupled to the second valve, the valve actuation system comprising:
        a user input device movable between at least a first position and a second position; and
        a brake sensor configured to provide a signal indicative of actuation of the first valve,
    wherein the valve actuation system is configured to:
        activate the second valve if the user input device is in the first position and the first valve is engaged;
        retain the second valve in the active state to hydraulically actuate the brake even if the first valve is disengaged; and
        deactivate the second valve if the user input device is moved to the second position.

2. The braking system of claim 1, wherein the user input device is normally biased to a third position.

3. The braking system of claim 2, wherein the user input device is a dual momentary rocker switch.

4. The braking system of claim 1, wherein the second valve is a solenoid operated valve.

5. The braking system of claim 1, wherein the brake sensor is a pressure switch configured to provide a signal when a pressure of a fluid flow from the first valve exceeds a predetermined threshold.

6. The braking system of claim 1, wherein the valve actuation system further comprises an actuation sensor, wherein the actuation sensor is configured to provide a signal indicative of a flow of the pressurized fluid from the second valve to the brake.

7. The braking system of claim 6, wherein the actuation sensor is a pressure switch, wherein the actuation sensor is configured to provide a signal when a pressure of a fluid flow from the second valve exceeds a predetermined threshold.

8. The braking system of claim 6, wherein the brake sensor and the actuation sensor are electrically coupled to the user input device.

9. The braking system of claim 1, wherein the user input device is configured to provide an indication based on the activation of the second valve.

10. The braking system of claim 1, further comprising a third valve,
    wherein the third valve is configured to selectively isolate flows of the pressurized fluid from the first valve and the second valve.

11. The braking system of claim 10, wherein a first port of the third valve is fluidly coupled to an outlet of the second valve, and a second port of the third valve is fluidly coupled to an outlet of the first valve.

12. The braking system of claim 11, further comprising a selection valve disposed downstream of the first valve along a flow direction from the first valve toward the brake, and disposed downstream of the second valve along a flow direction from the second valve toward the brake, the first port of the third valve being fluidly coupled to a first port of the selection valve along a flow path that does not include a second port of the selection valve, the second port of the third valve being fluidly coupled to the second port of the selection valve along a fluid path that does not include the first port of the selection valve.

13. The braking system of claim 1, wherein the brake pump is fluidly coupled to the brake via the second valve along a fluid path that does not include the first valve.

14. A method for braking a machine, the method comprising:

receiving a position of a user input device;

determining if a first valve is engaged by a user, wherein the first valve is configured to hydraulically actuate a brake;

activating a second valve based on a first position of the user input device and the engagement of the first valve;

fluidly coupling a brake pump to the brake via the first valve along a fluid path that does not include the second valve;

retaining the second valve in the active state to hydraulically actuate the brake even if the first valve is disengaged; and deactivating the second valve based on a second position of the user input device.

15. The method of claim 14, wherein determining if the first valve is engaged comprises receiving a signal via a brake sensor when a pressure of a fluid flow from the first valve exceeds a predetermined threshold.

16. The method of claim 14 further comprises indicating the activation of the second valve via the user input device.

17. The method of claim 14 further comprises providing a signal via an actuation sensor when a pressure of a fluid flow from the second valve exceeds a predetermined threshold.

18. The method of claim 14 further comprises activating a third valve when the second valve is activated, wherein the third valve is configured to isolate flows of a pressurized fluid from the first valve and the second valve.

* * * * *